(12) United States Patent
Sadeh

(10) Patent No.: US 10,699,437 B2
(45) Date of Patent: Jun. 30, 2020

(54) METHOD AND SYSTEM FOR AUTOMATIC CALIBRATION OF NEEDLE POSITION

(71) Applicant: Orisol Taiwan Limited, Fusing Township (TW)

(72) Inventor: Yaacov Sadeh, Rechovot (IL)

(73) Assignee: ORISOL TAIWAN LIMITED, Fusing Township (TW)

( * ) Notice: Subject to any disclaimer, the term of this patent is extended or adjusted under 35 U.S.C. 154(b) by 260 days.

(21) Appl. No.: 15/968,787

(22) Filed: May 2, 2018

(65) Prior Publication Data

US 2019/0340784 A1 Nov. 7, 2019

(51) Int. Cl.

| D05B 19/14 | (2006.01) |
|---|---|
| G06T 7/73 | (2017.01) |
| D05B 3/04 | (2006.01) |
| D05B 19/16 | (2006.01) |
| D05B 39/00 | (2006.01) |
| D05B 69/12 | (2006.01) |
| H04N 5/225 | (2006.01) |

(52) U.S. Cl.
CPC .............. *G06T 7/74* (2017.01); *D05B 3/04* (2013.01); *D05B 19/14* (2013.01); *D05B 19/16* (2013.01); *D05B 39/00* (2013.01); *D05B 69/12* (2013.01); *G06T 2207/30204* (2013.01); *H04N 5/2253* (2013.01)

(58) Field of Classification Search
CPC .......... D05B 19/14; D05B 39/00; G06T 7/74; G05B 19/35; G05B 19/402; G05B 19/19
See application file for complete search history.

(56) References Cited

U.S. PATENT DOCUMENTS

| 4,821,657 A | * | 4/1989 | Herdeg | D05B 19/08 |
|---|---|---|---|---|
| | | | | 112/470.04 |
| 2012/0222604 A1 | * | 9/2012 | Anderson | D05B 19/14 |
| | | | | 112/475.19 |
| 2016/0067739 A1 | * | 3/2016 | Jones | A61M 5/3287 |
| | | | | 604/507 |
| 2019/0377318 A1 | * | 12/2019 | Blenis, Jr. | D05B 19/08 |

\* cited by examiner

*Primary Examiner* — Tajash D Patel
(74) *Attorney, Agent, or Firm* — Birch, Stewart, Kolasch & Birch, LLP

(57) ABSTRACT

A method for automatic calibration of a needle position relative to a coordinate system of a sewing machine includes: controlling a X-Y table to move a pallet to bring a sheet under a needle, lowering the needle to penetrate the sheet to form a needle hole and raising the needle, controlling the X-Y table to move the pallet to bring a reference mark and the test hole into an FOV of an image capturing device, obtaining an image of the pallet which contains the reference mark and the needle hole, determining an amount of separation of the needle hole from the reference mark in the image, and calibrating the needle position relative to the coordination system based on the amount of separation thus determined and a reference distance.

22 Claims, 14 Drawing Sheets

METHOD AND SYSTEM FOR AUTOMATIC CALIBRATION OF NEEDLE POSITION

FIELD

The disclosure relates to a calibration method and a calibration system, and more particularly to a method and a system for automatic calibration of a needle position relative to a coordinate system of a sewing machine.

BACKGROUND

During operation of an automatic sewing machine that includes a sewing needle and an X-Y table, a pallet holding a workpiece and attached to the X-Y table is first moved by the X-Y table to a start sewing position, which is defined in a sewing program particularly for the workpiece, such that the workpiece is under the sewing needle, and the X-Y table is then controlled to move the pallet according to the sewing program so the workpiece can be sewed along a trail defined by the sewing program. However, there may be inaccuracy in the position of the sewing needle relative to a coordinate system of the automatic sewing machine in which the X-Y table is controlled to move, so the workpiece may be sewed inappropriately even if the X-Y table is controlled to move the pallet according to the sewing program.

Conventionally, calibration of a needle position relative to a coordinate system of an automatic sewing machine is performed manually by an operator of the sewing machine who makes slight adjustments to a position where the pallet is attached to the X-Y table of the automatic sewing machine until he/she finds that the needle is accurately positioned above a position of the workpiece that is to be sewed first with his/her naked eye. The aforementioned approach is labor intensive, and the accuracy of calibration is limited to human judgment (about +/−0.2 mm). Moreover, since the calibration is performed manually for the particular pallet attached to the X-Y table of the automatic sewing machine, this approach needs to be performed repeatedly for different sewing programs and pallets.

SUMMARY

Therefore, an object of the disclosure is to provide a method and a system for automatic calibration of a needle position that can alleviate at least one of the drawbacks of the prior art.

According to one aspect of the disclosure, the method is configured for automatic calibration of a needle position relative to a coordinate system of a sewing machine. The sewing machine includes a needle, an image capturing device which is disposed adjacent to the needle, and an X-Y table mechanism to which a pallet is attached and which brings the pallet to move with respect to the needle. The pallet is provided with a reference mark having a center at a first position defined by first coordinates of the coordinate system, and is formed with a test hole having a center at a second position defined by second coordinates of the coordinate system and spaced apart from the first position by a reference distance along one of an X axis and a Y axis of the coordinate system. The test hole is overlaid with a to-be-penetrated sheet. The method is to be implemented by a controller and includes steps of:

controlling the X-Y table mechanism to move the pallet according to the second coordinates to bring the to-be-penetrated sheet, which overlays the test hole, under the needle;

lowering the needle to penetrate the to-be-penetrated sheet to form a needle hole on the to-be-penetrated sheet, and then raising the needle;

controlling the X-Y table mechanism to move the pallet to bring the reference mark and the test hole into a field of view (FOV) of the image capturing device;

obtaining, by using the image capturing device, an image of the pallet within the FOV of the image capturing device, the image containing the reference mark and the needle hole formed in the to-be-penetrated sheet;

determining a location of the center of the reference mark and a location of the needle hole in the image;

determining an amount of separation of the location of the needle hole from the location of the center of the reference mark in the image; and calibrating a position of the needle relative to the coordination system based on the amount of separation thus determined and the reference distance.

According to another aspect of the disclosure, the system is configured for automatic calibration of a needle position relative to a coordinate system of a sewing machine. The sewing machine includes a needle and an X-Y table mechanism. The system includes an image capturing device, a pallet and a controller. The image capturing device is to be disposed adjacent to the needle. The pallet is to be attached to the X-Y table mechanism and is to be brought by the X-Y table mechanism to move with respect to the needle. The pallet is provided with a reference mark having a center at a first position defined by first coordinates of the coordinate system, and is formed with a test hole having a center at a second position defined by second coordinates of the coordinate system and spaced apart from the first position by a reference distance along one of an X axis and a Y axis of the coordinate system. The test hole is overlaid with a to-be-penetrated sheet. The controller is electrically connected to the X-Y table mechanism and the image capturing device, and is configured to:

control the X-Y table mechanism to move the pallet according to the second coordinates to bring the to-be-penetrated sheet, which overlays the test hole, under the needle;

lower the needle to penetrate the to-be-penetrated sheet to form a needle hole in the to-be-penetrated sheet, and then raise the needle;

control the X-Y table mechanism to move the pallet to bring the reference mark and the test hole into a field of view (FOV) of the image capturing device;

obtain, by using the image capturing device, an image of the pallet within the FOV of the image capturing device, the image containing the reference mark and the needle hole formed in the to-be-penetrated sheet;

determine a location of the center of the reference mark and a location of the needle hole in the image;

determine an amount of separation of the location of the needle hole from the location of the center of the reference mark in the image; and calibrate a position of the needle relative to the coordination system based on the amount of separation thus determined and the reference distance.

An effect of the method for automatic calibration of a needle position according to the disclosure resides in that, by arrangement of the reference mark and the to-be-penetrated sheet on the pallet, and by taking an image of the pallet that contains the reference mark and the needle hole formed by penetrating the to-be-penetrated sheet with the needle, deviation of the needle position may be determined by analyzing the image, so the position of the needle relative to the coordination system may be calibrated based on the deviation thus determined. In this way, an automatic and labor-saving calibration method may be realized. Moreover, with the aid of the controller that analyzes the image of the pallet, the accuracy of calibration may be improved compared with the conventional calibration approach implemented through human judgment.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
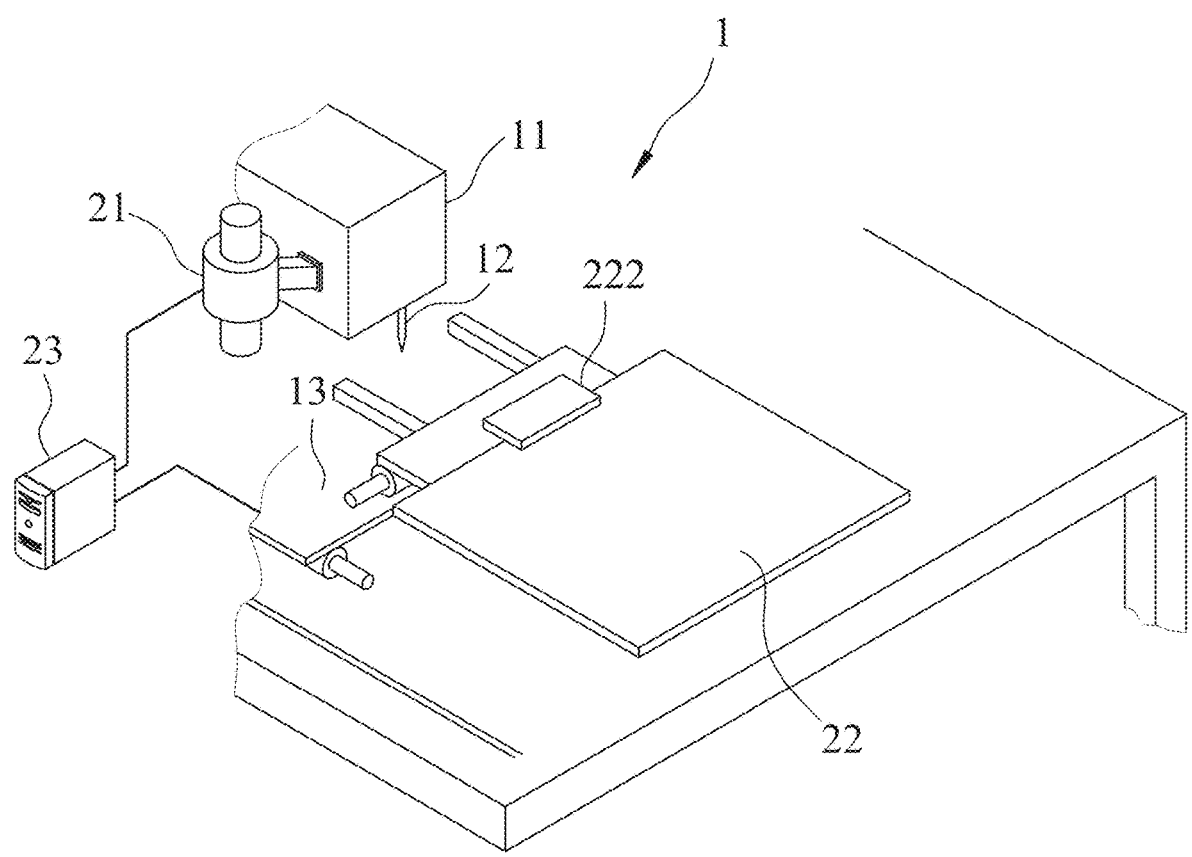
FIG. 1 is perspective view of a first embodiment of a system for automatic calibration of a needle position relative to a coordinate system of a sewing machine according to the disclosure.

Referring to FIG. 1, a first embodiment of a system for automatic calibration of a needle position relative to a coordinate system of a sewing machine 1 according to the disclosure is illustrated. The sewing machine 1 includes a sewing head 11, a needle 12 attached to the sewing head 11 and controllable to extend and retract with respect to the sewing head 11 to sew a workpiece, and an X-Y table mechanism 13. The system includes an image capturing device 21, a pallet 22 and a controller 23. The image capturing device 21 is to be attached to the sewing head 11, is to be disposed adjacent to the needle 12, and faces a sewing area where the workpiece is to be disposed for sewing. The pallet 22 is to be attached to the X-Y table mechanism 13 and is to be brought by the X-Y table mechanism 13 to move with respect to the needle 12. The controller 23 is electrically connected to the X-Y table mechanism 13 and the image capturing device 21, and may be exemplified by an electronic device having computing capabilities, such as a personal computer, an industrial computer, a microprocessor, etc.

Figure 2:
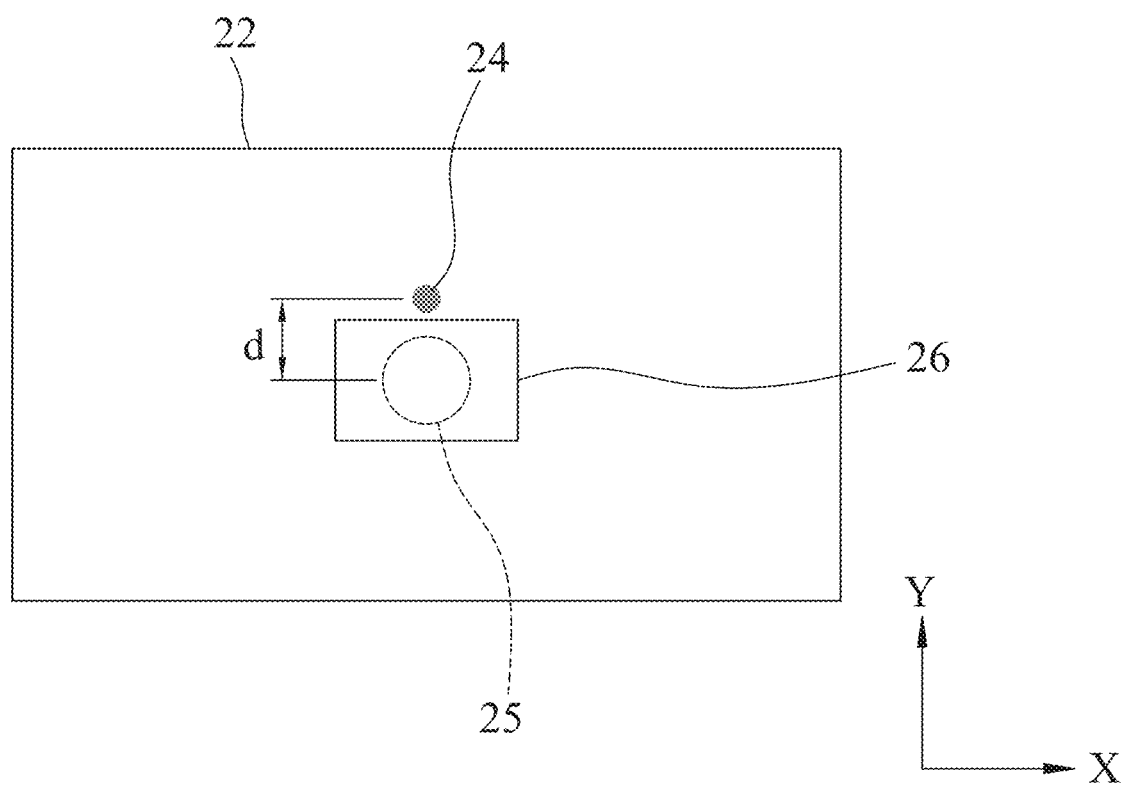
FIG. 2 is a schematic diagram illustrating an embodiment of a pallet of the system according to the disclosure.

Referring to FIG. 2, the pallet 22 is exemplified by a calibration pallet which is a metal sheet to be attached to the X-Y table mechanism 13 via means 222 (see FIG. 1) such as clamping means. The pallet 22 is provided with a reference mark 24 having a center at a first position defined by first coordinates (Xc, Yc) of the coordinate system, and is formed with a test hole 25 having a center at a second position defined by second coordinates (Xc, Yc-d) of the coordinate system which is spaced apart from the first coordinates by a reference distance (d) along one of an X axis and a Y axis of the coordinate system. In the first embodiment of the system, the second position is spaced apart from the first position along the Y axis, but in another embodiment, the second position may be spaced apart from the first position along the X axis, and in that case, the second coordinates would be (Xc-d, Yc).

The test hole 25 is overlaid with a to-be-penetrated sheet 26, and in the first embodiment of the system, the to-be-penetrated sheet 26 is exemplified by a sticker so that the to-be-penetrated sheet 26 is able to be fastened on the pallet 22 and is able to be replaced by a new sticker after being penetrated by the needle 12 for a next round of calibration. In the first embodiment of the system, the test hole 25 has a diameter of 6 millimeters, the reference distance (d) is 10 millimeters, and the reference mark 24 is exemplified by a small hole that has a diameter of 3 millimeters and that is formed by a milling tool with the same diameter. However, the reference distance (d), and the diameters of the small hole (i.e., the reference mark 24) and the test hole 25 are not limited to the disclosure herein, and may be altered in other embodiments based on practical needs, such as taking into consideration the inaccuracy of the sewing machine 1 before calibration.

It is worthy to note that when describing a position on the pallet 22 defined by specific coordinates of the coordinate system, it means that for the sewing machine 1 which has been appropriately calibrated, when the pallet 22 is attached to the X-Y table mechanism 13 and the X-Y table mechanism 13 is controlled to move the pallet 22 according to the specific coordinates, the position on the pallet 22 defined by the specific coordinates will be positioned exactly under the needle 12.

Referring to FIG. 1 once again, the image capturing device 21 is exemplified by a universal serial bus (USB) camera in the first embodiment of the system which is able to be electrically connected to the controller 23 with ease, and has a spatial resolution of 0.05 mm/pixel. Therefore, if the USB camera has 600×600 pixels on its image sensor, a field of view (FOV) 211 (see FIG. 3) of the image capturing device 21 should be 30×30 mm. It is noted that the FOV 211 mentioned herein is an area of inspection captured on the image sensor of the USB camera. Moreover, referring to FIG. 3, the image capturing device 21 is mounted to the sewing head 11 in such a manner that a center of the FOV 211 of the image capturing device 21 is spaced apart from the needle 12 by a first mounting distance (dx) along the X axis and a second mounting distance along the Y axis (dy).

Figure 14:
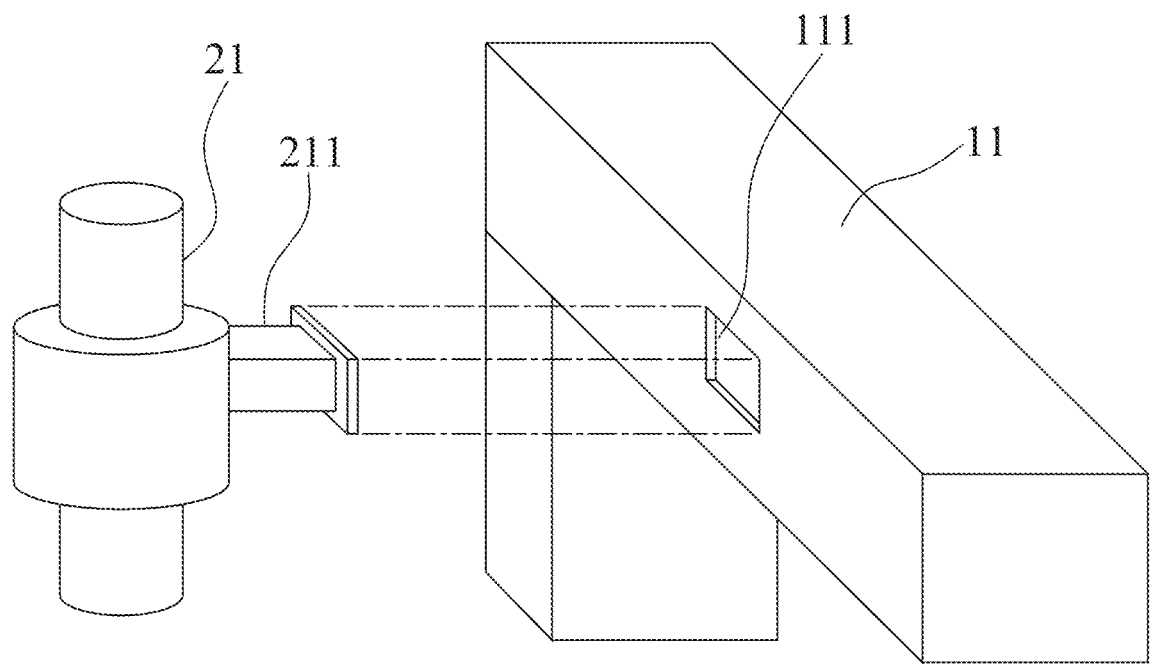
FIG. 14 is a perspective view of an embodiment of attachment of an image capturing device to a sewing head.

Referring to FIG. 14, the sewing head 11 is formed with a mounting receptacle 111, such as a recess, on one side of the sewing head 11, and the image capturing device 21 is to be mounted to the sewing head 11 at the mounting receptacle 111. In one embodiment, the image capturing device 21 includes a mounting base, such as a magnetic mounting base, that corresponds in shape with the mounting receptacle 111 so as to fit into the mounting receptacle 111. In this way, the image capturing device 21 can be detached from the sewing head 11 after calibration of the needle position relative to the coordinate system is finished, so the image capturing device 21 may not be damaged during or interfere with subsequent sewing process. In one embodiment, a lens of the image capturing device 21 has a fixed focal length and a fixed aperture.

In addition, for the purpose of mitigating inaccuracy resulting from lens aberration, the reference distance (d) is not greater than three tenths (i.e., 30%) of a dimension of the FOV 211 of the image capturing device 21. However, the specs (specifications) of the image capturing device 21 and the relationship between the reference distance (d) and the dimension of the FOV 211 are not limited to the disclosure herein, and may be altered based on practical needs in other embodiments.

Figure 3:
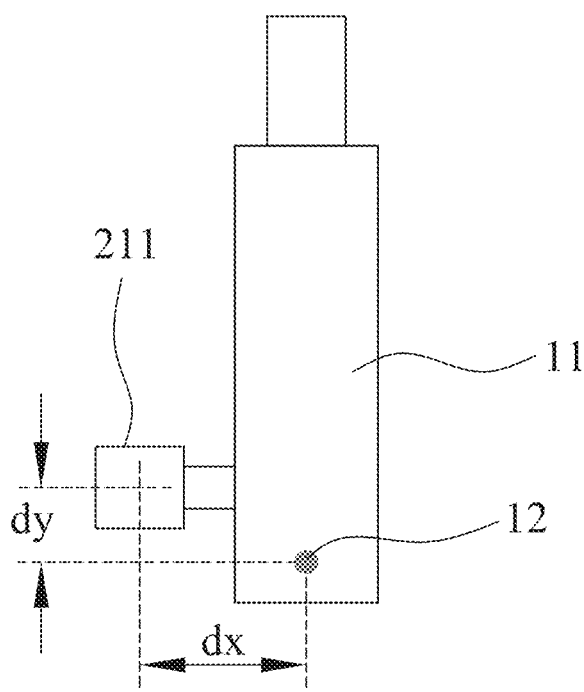
FIG. 3 is a schematic diagram illustrating a top view of the a portion of the sewing machine and the pallet.
Figure 3:
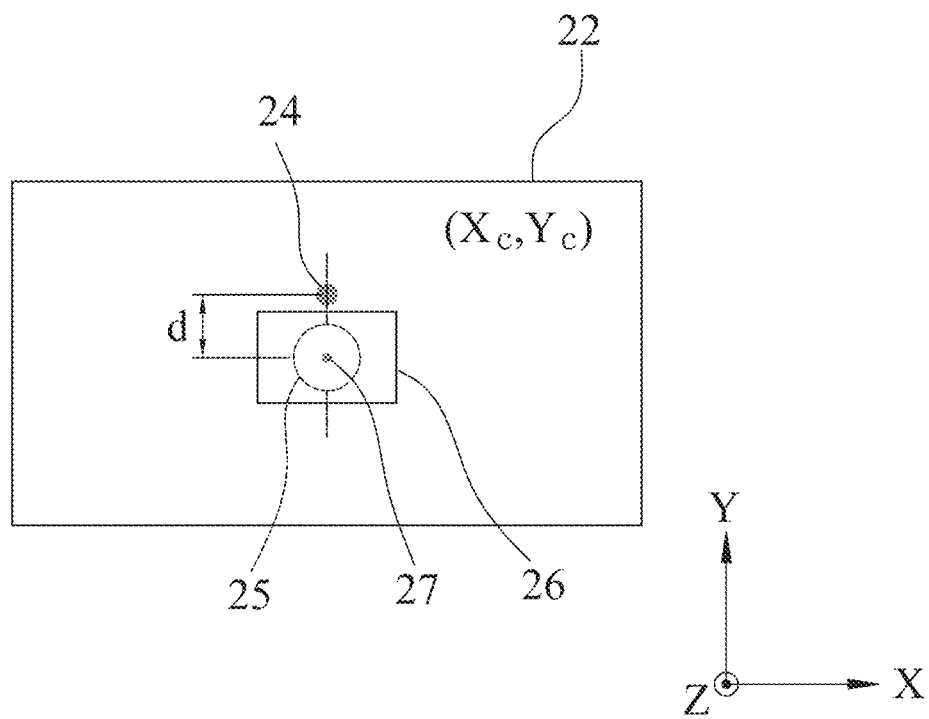
Figure 4:
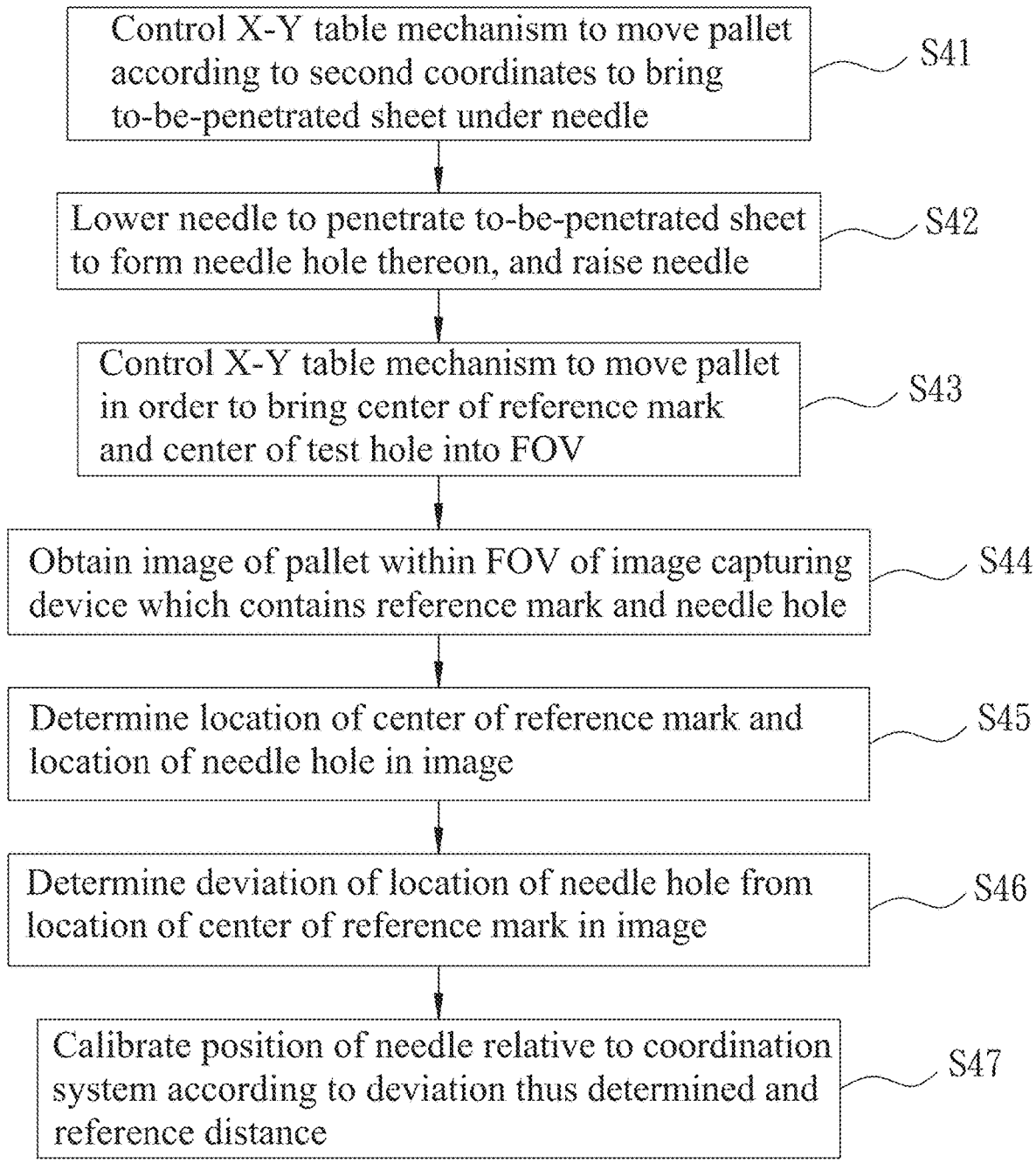
FIG. 4 is a flow chart illustrating a first embodiment of a method for automatic calibration of a needle position relative to a coordinate system of a sewing machine according to the disclosure.

Referring to FIG. 4 in combination with FIGS. 1 and 3, a first embodiment of a method for automatic calibration of a needle position relative to a coordinate system of a sewing machine according to the disclosure is illustrated. The method is to be implemented by the system introduced above. Before the method is performed, the pallet 22, on which the reference mark 24 is still visible while the test hole 25 is overlaid with the to-be-penetrated sheet 26, is attached to the X-Y table mechanism 13, and a command is then inputted to launch the method. The method includes steps S41 to S47.

In step S41, the controller 23 controls the X-Y table mechanism 13 to move the pallet 22 according to the second coordinates (Xc, Yc-d) to bring the to-be-penetrated sheet 26, which overlays the test hole 25, under the needle 12. It is noted that, if the sewing machine 1 is appropriately calibrated, the center of the test hole 25 should be brought directly under the needle 12.

In step S42, the controller 23 lowers the needle 12 to penetrate the to-be-penetrated sheet 26 to form a needle hole 27 in the to-be-penetrated sheet 26, and then raises the needle 12. Specifically, the controller 23 controls a motor that is coupled to the needle 12 to actuate Z-axis operation of the needle 21 to lower or raise the needle 12, and utilizes angular position feedback of an encoder of the motor to determine when to raise the needle 12. It is noted that FIG. 3 shows an ideal situation where the needle hole 27 is located at the center of the test hole 25. However, in a condition that the needle 12 is deviated relative to its desired position in the coordinate system, the needle hole 27 may not be located at the center of the test hole 25.

Figure 5:
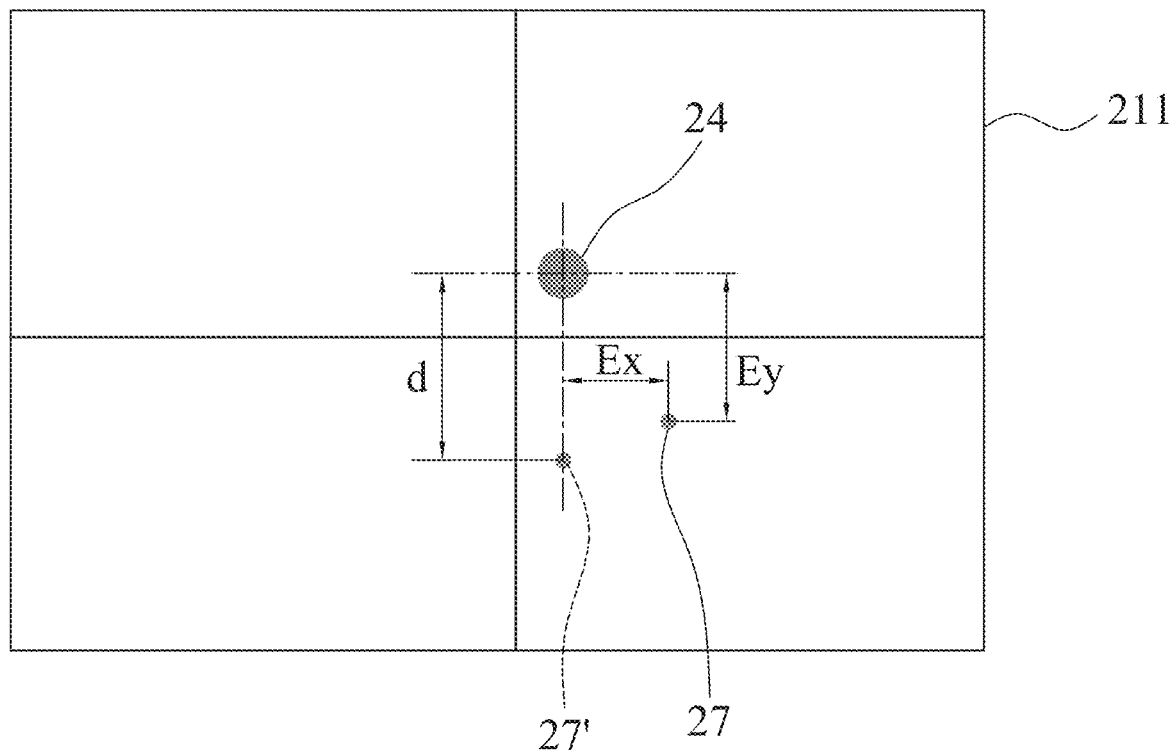
FIG. 5 is a schematic diagram illustrating an embodiment of a reference mark and a needle hole in a field of view (FOV) of the image capturing device.

In step S43, the controller 23 controls the X-Y table mechanism 13 to move the pallet 22 in order to bring the reference mark 24 and the test hole 25 into the FOV 211 of the image capturing device 21 (see FIGS. 5 and 3). Specifically, the controller 23 controls the X-Y table mechanism 13 to move the pallet 22 in order to bring a middle point, which is between the center of the reference mark 24 and the center of the test hole 25, under the center of the FOV 211 of the image capturing device 21. More specifically, the controller 23 controls the X-Y table mechanism 13 to move the pallet 22 by the first mounting distance (dx) along the X axis, and by a distance along the Y axis which is equal to a difference between the second mounting distance (dy) and a quotient of the reference distance divided by two (d/2), that is, the distance along the Y axis is equal to dy−d/2.

In the first embodiment of the method, since the reference distance (d) is 10 millimeters, for an ideally calibrated sewing machine, the center of the reference mark 24 should be about 5 millimeters above the center of the FOV 211 along the Y axis, and the center of the test hole 25 should be 5 millimeters below the center of the FOV 211 along the Y axis after step S43 is performed. FIG. 5 illustrates a practical situation where the needle 12 has not yet been calibrated relative to the coordinate system, and the middle point is thus not located at the center of the FOV 211.

The purpose of step S43 is to position the reference mark 24 and the needle hole 27 in a central region of the FOV 211 where optical aberration of the image capturing device 21 is relatively subtle compared with an outer region of the FOV 211, so as to mitigate image distortion and to improve accuracy of calibration.

In a variation of the first embodiment of the method where the second position is spaced apart from the first position by the reference distance (d) along the X axis of the coordinate system, that is, the second position is defined by the coordinates of (Xc-d, Yc), the controller 23 controls the X-Y table mechanism 13 to move the pallet 22 by the second mounting distance (dy) along the Y axis, and by a distance along the X axis which is equal to a difference between the first mounting distance (dx) and a quotient of the reference distance divided by two (d/2), that is, the distance along the X axis is equal to dx−d/2.

Figure 6:
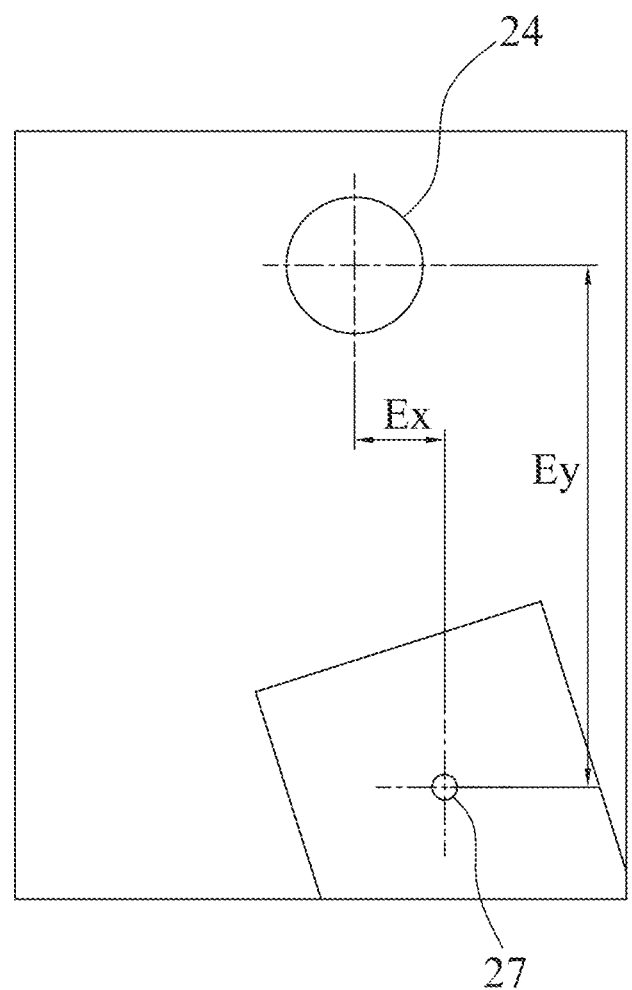
FIG. 6 is an exemplary image of the pallet containing the reference hole and the needle hole.

In step S44, the controller 23 obtains, by using the image capturing device 21, an image of the pallet 22 within the FOV 211 of the image capturing device 21 where the image contains the reference mark 24 and the needle hole 27 formed in the to-be-penetrated sheet 26. Referring to FIG. 6, an actual example of the image is shown.

In step S45, the controller 23 determines a location of the center of the reference mark 24 and a location of the needle hole 27 in the image. Computer vision, object recognition, and/or an algorithm available on the market for finding the center of mass of a circular shape may be used in the first embodiment of the method to determine the locations of the center of the reference mark 24 and the needle hole 27 in the image.

In step S46, the controller 23 determines an amount of separation of the location of the needle hole 27 from the location of the center of the reference mark 24 in the image. Specifically, referring to FIGS. 5 and 6, the controller 23 determines distances in pixels between the location of the center of the reference mark 24 and the location of the needle hole 27 in the image along a horizontal direction and a vertical direction of the image, respectively. More specifically, the controller 23 further determines actual distances (Ex, Ey) between the center of the reference mark 24 and the needle hole 27 in the pallet 22 respectively along the X axis and the Y axis of the coordinate system based on the distances in pixels thus determined and the spatial resolution of the image capturing device 21. For example, if the distances in pixels respectively along the horizontal direction and the vertical direction are 40 pixels and 160 pixels, respectively, the actual distances (Ex, Ey) respectively along the X axis and Y axis can be calculated by 40 pixels×0.05 (mm/pixel)=2 mm, and 160 pixels×0.05 (mm/pixel)=8 mm, respectively. A theoretical needle hole 27' is shown in FIG. 5 to explain where the needle hole 27 would be if the needle position relative to the operating system of the sewing machine 1 were accurately calibrated.

In step S47, the controller 23 calibrates a position of the needle 12 relative to the coordination system based on the amount of separation thus determined and the reference distance (d). Specifically, the controller 23 calculates a difference between the reference distance (d) along the Y axis and the actual distance (Ey) along the Y axis to result in an offset distance (Dy) along the Y axis (i.e., Dy=d−Ey). The controller 23 then adjusts the needle 12 relative to the coordinate system along the Y axis by the offset distance (Dy), and adjusts the needle 12 relative to the coordinate system along the X axis by the actual distance (Ex) along the X axis (in other words, an offset distance (Dx) along the X axis equals Ex). In this way, the needle position relative to the coordinate system of the sewing machine 1 may be appropriately calibrated. It is noted that the adjustment may be performed on the needle 12 and/or on the X-Y table mechanism 13, as long as a relative position of the needle 12 with respect to the coordinate system, in which the X-Y table mechanism 13 is controlled to move, can be adjusted to achieve an effect of needle position calibration.

In another embodiment where the second position is spaced apart from the first position only along the X axis, i.e., the second position is defined by the second coordinates (Xc−d, Yc), the controller 23 may adjust the needle 12 relative to the coordinate system along the X axis by an offset distance (Dx), which is a difference between the reference distance (d) along the X axis and the actual distance (Ex) along the X axis (i.e., Dx=d−Ex), and the controller 23 adjusts the needle 12 relative to the coordinate system along the Y axis by the actual distance (Ey) along the Y axis (i.e., Dy=Ey).

Figure 7:
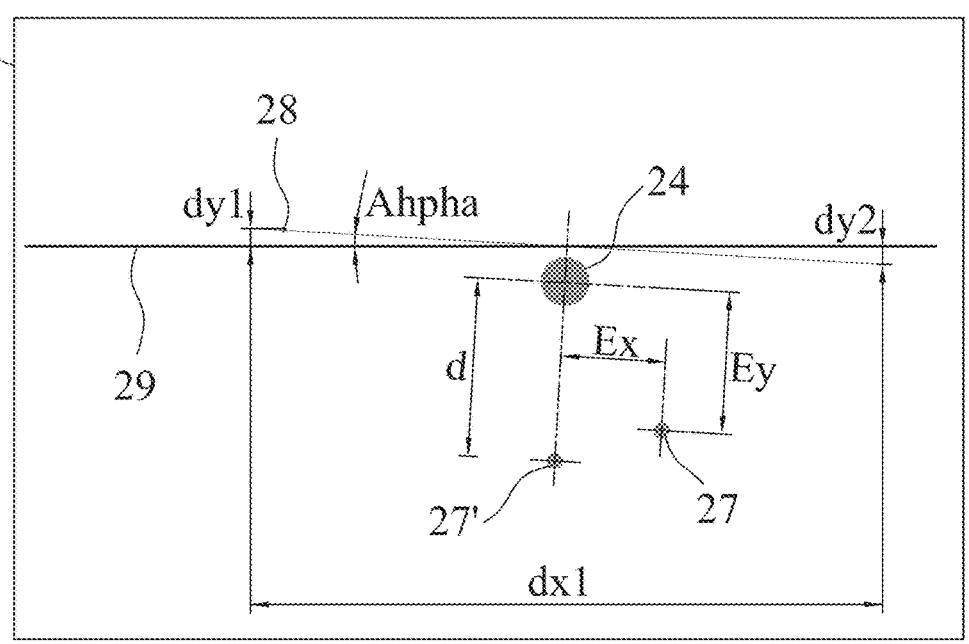
FIG. 7 is a schematic diagram illustrating a pallet that is provided with a reference line in a second embodiment of the system according to the disclosure.

Referring to FIGS. 1 and 7, in a second embodiment of a system for automatic calibration of a needle position relative to a coordinate system of the sewing machine 1 according to the disclosure, the pallet 22 is further provided with a reference line 28 which is parallel to the X axis of the coordinate system when the pallet 22 is attached to the X-Y table mechanism 13. Therefore, the image obtained by using the image capturing device 21 further contains the reference line 28. The reference line 28 is provided for the purpose of mitigating an issue of angular misalignment between the FOV 211 of the image capturing device 21 and the coordinate system of the sewing machine 1 caused by inaccurate mounting of the image capturing device 21 on the sewing head 11. For example, as shown in FIG. 7, the FOV 211 of the image capturing device 21 is rotated counterclockwise about a Z axis of the coordinate system.

Figure 8:
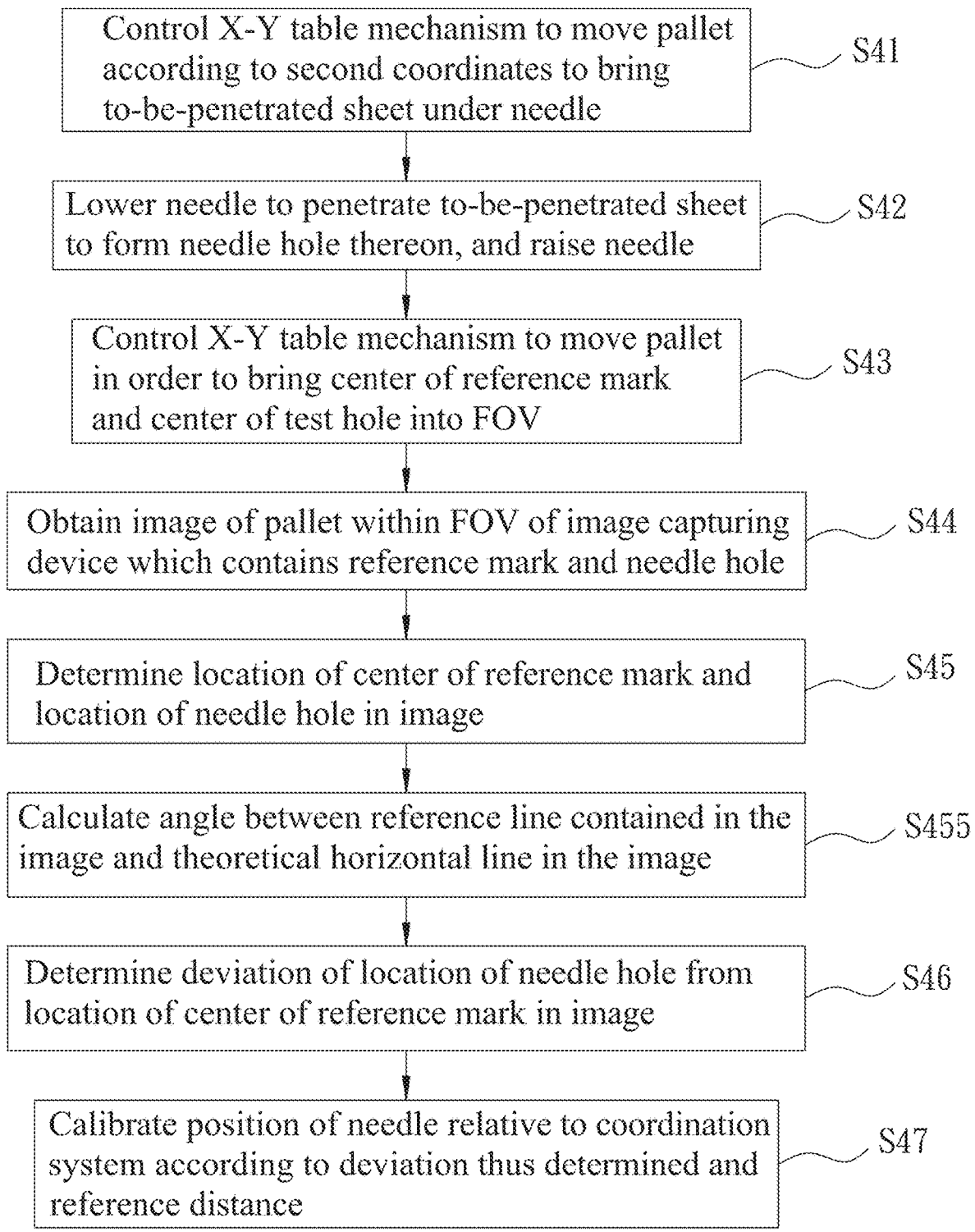
FIG. 8 is a flow chart illustrating a second embodiment of the method according to the disclosure.

Referring to FIG. 8, a second embodiment of a method for automatic calibration of a needle position relative to a coordinate system of a sewing machine according to the disclosure is illustrated, and is to be implemented by the second embodiment of the system mentioned above. The second embodiment of the method is similar to the first embodiment of the method, and is different in that the second embodiment of the method further includes, subsequent to step S45 and prior to step S46, step S455, in which the controller 23 calculates an angle (Alpha) between the reference line 28 contained in the image and a theoretical horizontal line 29 in the image (see FIG. 7). Specifically, the angle (Alpha) between the reference line 28 and the theoretical horizontal line 29 is calculated according to the equation of:

$$\alpha = \arctan\left(\frac{dy1 + dy2}{dx1}\right),$$

where α represents the angle between the reference line 28 and the theoretical horizontal line 29, dy1 and dy2 respectively represent displacements of two terminations of the reference line 28 from the theoretical horizontal line 29 along the vertical direction of the image, respectively, and dx1 represents a distance between the two terminations along the horizontal direction of the image.

Figure 9:
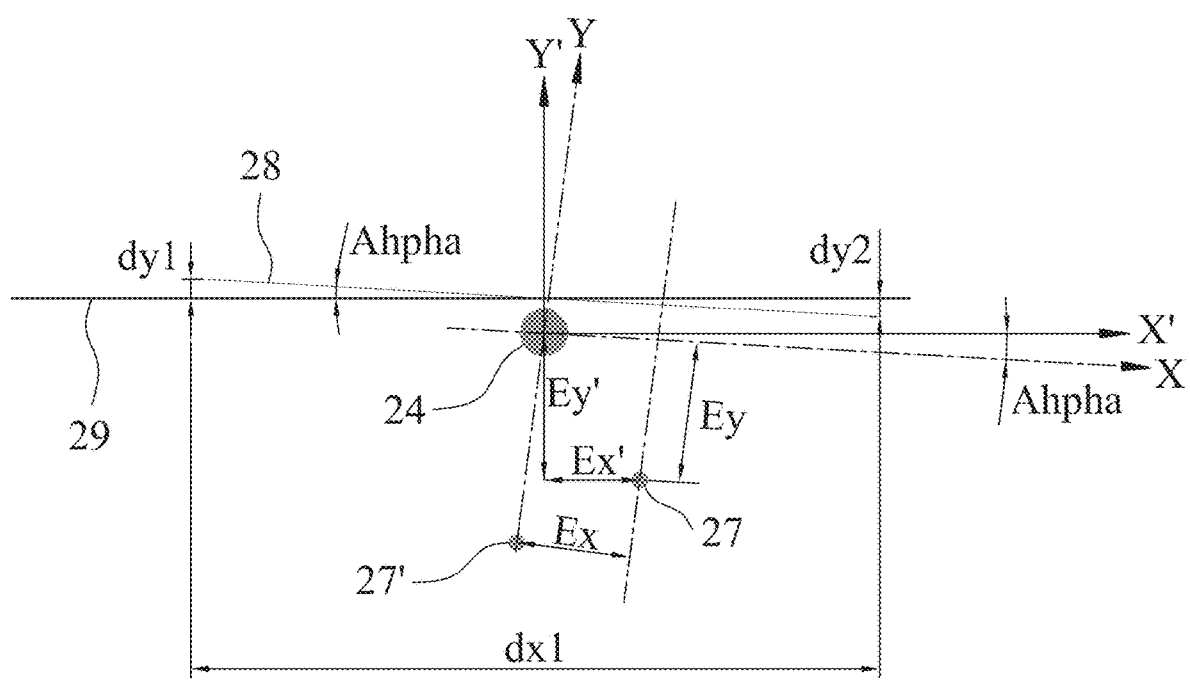
FIG. 9 is a schematic diagram illustrating angular misalignment between the FOV and the coordinates system in the second embodiment of the system according to the disclosure.

Referring to FIG. 9, the difference between the second embodiment and the first embodiment of the method further resides in S46, in which, aside from the previously determined distances in pixels between the location of the center of the reference mark 24 and the location of the needle hole 27 in the image along the horizontal direction and the vertical direction of the image, respectively, and the spatial resolution of the image capturing device 21 (e.g., 0.05 mm/pixel), the controller 23 determines the actual distances (Ex, Ey) between the center of the reference mark 24 and the needle hole 27 in the pallet 22 respectively along the X axis and the Y axis of the coordinate system further based on the angle (alpha) thus calculated. Specifically, the actual distances (Ex, Ey) are calculated according to a set of equations of:

$$Ex = Ex' \cos(80-\alpha) - Ey' \sin(180-\alpha), \text{ and}$$

$$Ey = Ex' \sin(180-\alpha) + Ey' \cos(180-\alpha),$$

where Ex and Ey respectively represent the actual distances between the center of the reference mark 24 and the needle hole 27 in the pallet 22 respectively along the X axis and the Y axis, Ex' and Ey' respectively represent converted distances from pixels to a designated unit of length (e.g., millimeters in this embodiment or inches in other embodiments) between the location of the center of the reference mark 24 and the location of the needle hole 27 in the image respectively along the horizontal direction (X') and the vertical direction (Y') of the image, and α represents the angle (Alpha) between the reference line 28 and the theoretical horizontal line 29. Specifically, the converted distances (Ex', Ey') from pixels to the designated unit of length between the location of the center of the reference mark 24 and the location of the needle hole 27 in the image respectively along the horizontal direction (X') and the vertical direction (Y') of the image are each calculated by multiplying a respective one of the distances in pixels with the spatial resolution of the image capturing device 21.

It is noted that the set of equations is adapted for transformation between two coordinate systems (i.e., XY and X'Y'). In this way, the angular misalignment between the FOV 211 of the image capturing device 21 and the coordinate system of the sewing machine 1 can be mitigated.

In a variation of the second embodiment of the system, the reference line 28 provided on the pallet 22 may be positioned parallel to the Y axis of the coordinate system when the pallet 22 is attached to the X-Y table mechanism 13. In this case, the angle (Alpha) is calculated between the reference line 28 contained in the image and a theoretical vertical line in the image.

It is worth noting that it is not necessary for the image capturing device 21 to be perfectly mounted to the sewing head 11, as long as the FOV 211 of the image capturing device 21 is spaced apart from the needle 12 by approximately the first mounting distance (dx) along the X axis and the second mounting distance (dy) along the Y axis to allow the reference mark 24 and the needle hole 27 in the pallet 22 to be brought into the central region of the FOV 211. Moreover, with the aforesaid function of mitigating the angular misalignment between the FOV 211 and the coordinate system, the image capturing device 21 is no longer required to be accurately mounted to the sewing head 11 with its FOV 211 angularly aligned with the coordinate system. By virtue of these two features, a quick removable mounting mechanism, such as a magnetic mount or hook-and-loop fasteners, may be utilized to quickly attach/detach the image capturing device 21 to/from the sewing head 11 and even on an arbitrary location provided that the reference mark 24 and the needle hole 27 in the pallet 22 can be brought within the FOV 211 of the image capturing device 21. The accuracy of calibration of the needle position relative to the coordinate system in fact depends on the analysis of the actual distances (Ex, Ey) between the needle hole 27 and the center of the reference mark 24, regardless of what position and orientation they are located within the FOV 211, and the accuracy can be further improved if the needle hole 27 and the center of the reference mark 24 are located in the central region of the FOV 211.

Figure 10:
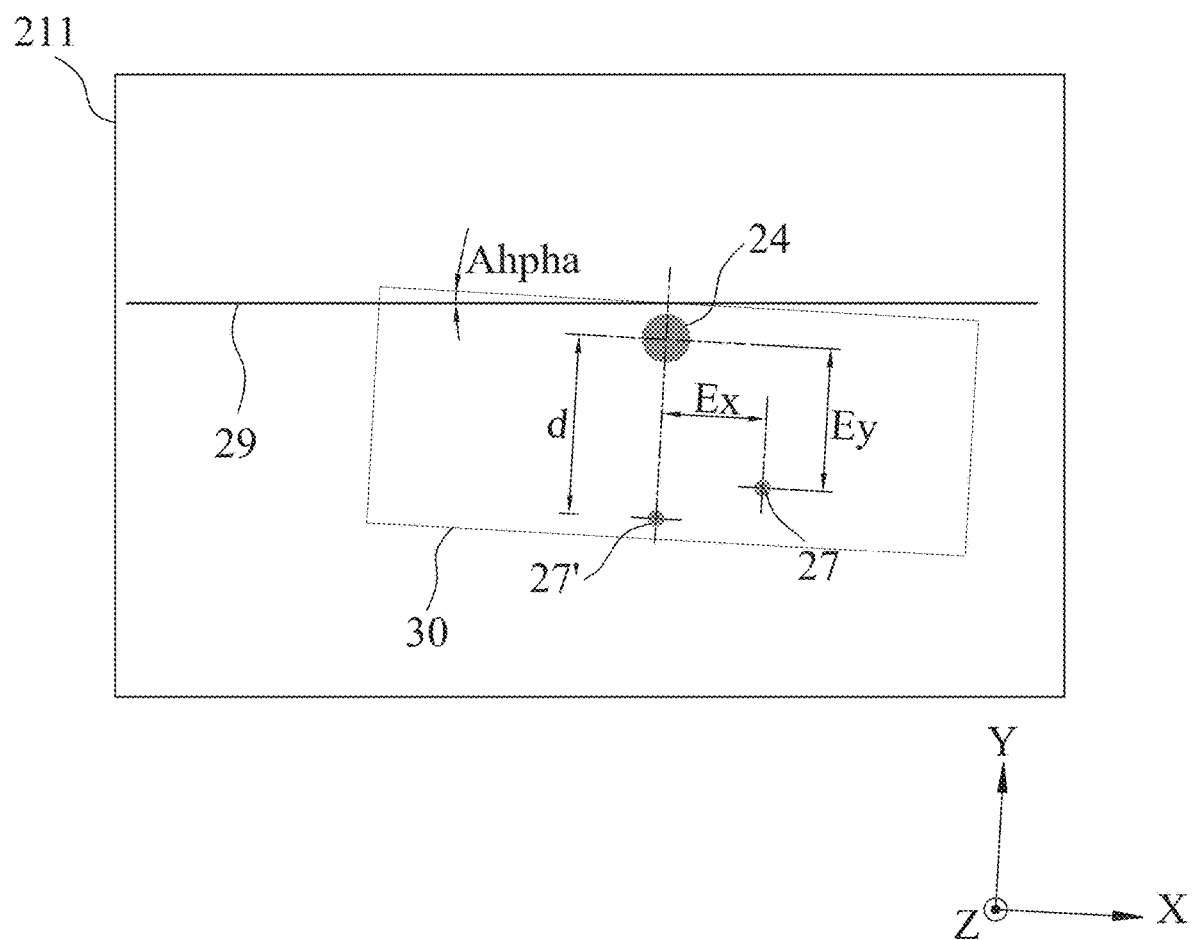
FIG. 10 is a schematic diagram illustrating a pallet that is provided with a reference rectangle in a third embodiment of the system according to the disclosure.

Referring to FIGS. 1 and 10, in a third embodiment of a system for automatic calibration of a needle position relative to a coordinate system of the sewing machine 1 according to the disclosure, the pallet 22 is further provided with a reference rectangle 30, one side of which is parallel to the X axis of the coordinate system when the pallet 22 is attached to the X-Y table mechanism 13. The dimensions of the reference rectangle 30 are set in advance according to the FOV 211 such that the image obtained by using the image capturing device 21 further contains the complete reference rectangle 30. The reference rectangle 30 is provided for the purpose of mitigating the issue of angular misalignment between the FOV 211 of the image capturing device 21 and the coordinate system of the sewing machine 1 caused by inaccurate mounting of the image capturing device 21 on the sewing head 11. For example, as shown in FIG. 10, the FOV 211 of the image capturing device 21 is rotated counter-clockwise about a Z axis of the coordinate system. In comparison with the second embodiment of the system, said one side of the reference rectangle 30 provided on the pallet 22 of the third embodiment of the system may serve as the reference line 28 in the second embodiment of the system as shown in FIG. 7. Moreover, the reference rectangle 30 is provided for another purpose, that is enabling the controller 23 to determine conversion ratios between pixels and the designated unit of length, e.g., millimeters, along the horizontal direction and the vertical direction of the image, respectively.

Figure 11:
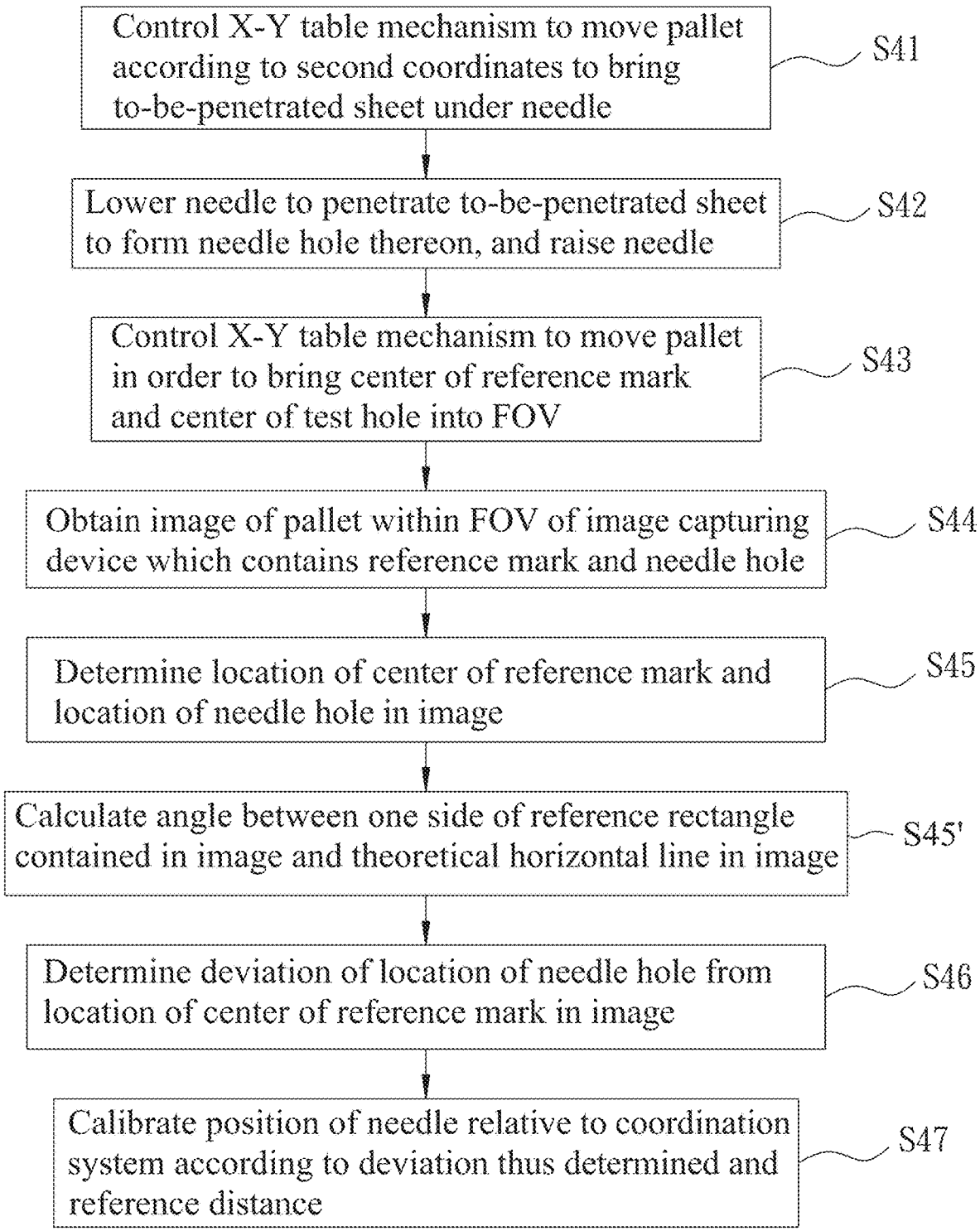
FIG. 11 is a flow chart illustrating a third embodiment of the method according to the disclosure.
Figure 12:
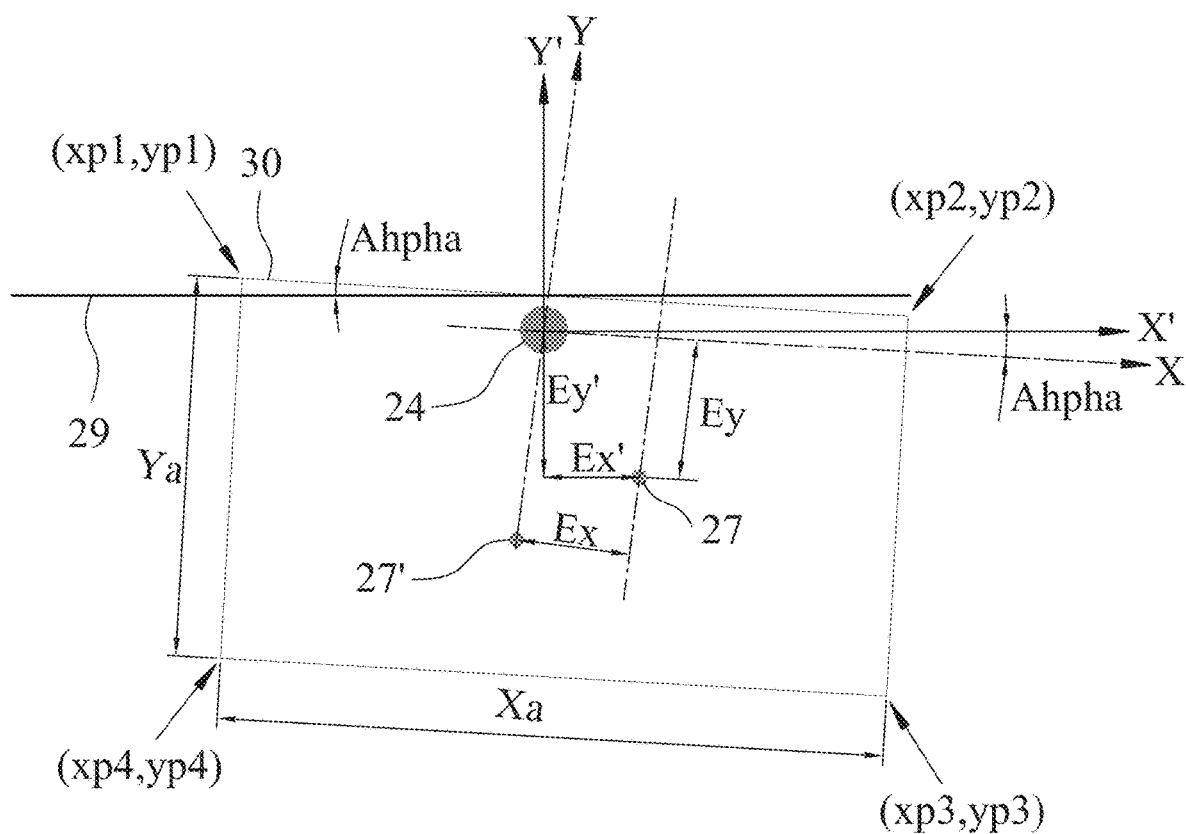
FIG. 12 is a schematic diagram illustrating angular misalignment between the FOV and the coordinates system in the third embodiment of the system according to the disclosure.

Referring to FIG. 11, a third embodiment of a method for automatic calibration of a needle position relative to a coordinate system of a sewing machine according to the disclosure is illustrated, and is to be implemented by the third embodiment of the system mentioned above. The third embodiment of the method is similar to the first embodiment of the method, and is different in that the third embodiment of the method further includes, subsequent to step S45 and prior to step S46, step S455', in which the controller 23 calculates an angle (Alpha) between said one side of the reference rectangle 30 contained in the image and a theoretical horizontal line 29 in the image (see FIG. 10). Referring to FIG. 12, the controller 23 determines locations of four corners of the reference rectangle 30 coordinate in the image. The locations of each of the four corners may be presented with a respective set of pixel values, such as (xp1, yp1), (xp2, yp2), (xp3, yp3) and (xp4, yp4). The conversion ratios between pixels and the designated unit of length (i.e., pixels to millimeters) along the horizontal direction and the vertical direction of the image, respectively, are calculated according to the equations of:

$$X_{ratio}(\text{pixel/mm}) = \frac{[\text{abs}(xp1 - xp2) + \text{abs}(xp4 - xp3)]}{2Xa}, \text{ and}$$

$$Y_{ratio}(\text{pixel/mm}) = \frac{[\text{abs}(yp1 - yp4) + \text{abs}(yp2 - xp3)]}{2Ya},$$

where $X_{ratio}$ and $Y_{ratio}$ respectively represent the conversion ratios between pixels and millimeters along the horizontal direction and the vertical direction of the image, and Xa and Ya respectively represent the dimensions of the reference rectangle 30 in millimeters. The controller 23 then calculates the angle (Alpha) between said one side of the reference rectangle 30 and the theoretical horizontal line 29 according to the equations of:

$$\alpha = \arctan\left(\frac{dY}{Xa}\right), \text{ and } dY = \frac{(yp1 - yp2)}{Y_{ratio}}$$

where α represents the angle between said one side of the reference rectangle 30 and the theoretical horizontal line 29, and dY represents a conversion of a distance between yp1 and yp2 from pixels to millimeters.

Referring to FIG. 12, the difference between the third embodiment and the first embodiment of the method further resides in S46, in which, aside from the previously determined distances in pixels between the location of the center of the reference mark 24 and the location of the needle hole 27 in the image along the horizontal direction and the vertical direction of the image, respectively, the controller 23 determines the actual distances (Ex, Ey) between the center of the reference mark 24 and the needle hole 27 in the pallet 22 respectively along the X axis and the Y axis of the coordinate system further based on the conversion ratios ($X_{ratio}$ and $Y_{ratio}$) and the angle (alpha) thus calculated.

Specifically, the actual distances (Ex, Ey) are calculated according to a set of equations of:

$$Ex = Ex' \cos(180-\alpha) - Ey' \sin(180-\alpha), \text{ and}$$

$$Ey = Ex' \sin(180-\alpha) + Ey' \cos(180-\alpha),$$

where Ex and Ey respectively represent the actual distances between the center of the reference mark 24 and the needle hole 27 in the pallet 22 respectively along the X axis and the Y axis, Ex' and Ey' respectively represent converted distances from pixels to a designated unit of length (e.g., millimeters in this embodiment or inches in other embodiments) between the location of the center of the reference mark 24 and the location of the needle hole 27 in the image respectively along the horizontal direction (X') and the vertical direction (Y') of the image, and a represents the angle (Alpha) between the reference line 28 and the theoretical horizontal line 29. Specifically, the converted distances (Ex', Ey') from pixels to the designated unit of length between the location of the center of the reference mark 24 and the location of the needle hole 27 in the image respectively along the horizontal direction (X') and the vertical direction (Y') of the image are each calculated by multiplying a respective one of the distances in pixels with a respective one of the conversion ratios ($X_{ratio}$ and $Y_{ratio}$) determined in step S455'.

Figure 13:
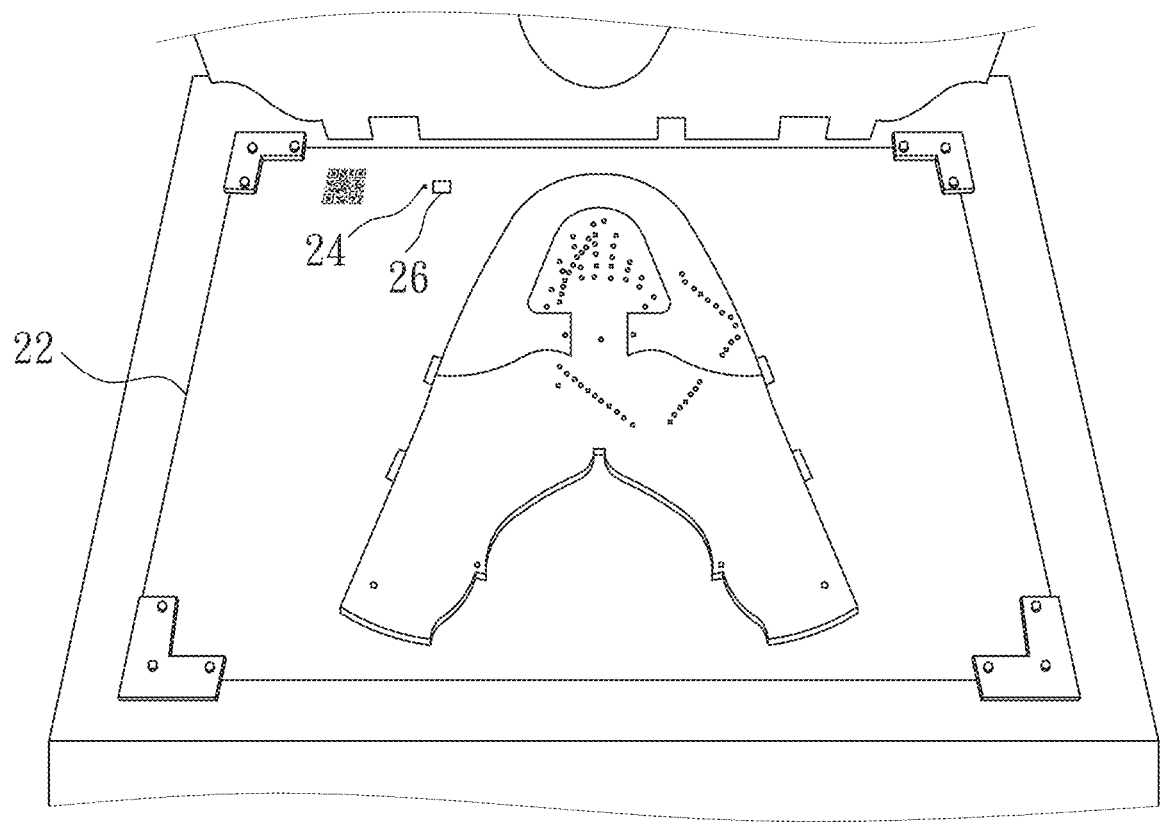
FIG. 13 is a perspective view of an embodiment of a pallet that holds a workpiece and that is provided with the reference mark and a to-be-penetrated sheet.

Referring to FIG. 13, in a fourth embodiment of a system for automatic calibration of a needle position relative to a coordinate system of the sewing machine 1 (see FIG. 1) according to the disclosure, the pallet 22 is not a calibration pallet dedicated for calibration, but instead is a workpiece pallet which actually holds a workpiece to be sewed and which is also provided with the reference mark 24 and the test hole that is invisible from the figure because it is overlaid with the to-be-penetrated sheet 26. The locations of the reference mark 24 and the test hole 25 is not limited to the example herein, and can be arranged according to actual needs, such as being related to the shape of the workpiece, etc. By using the workpiece pallet in place of the calibration pallet, the method of automatic calibration of a needle position can be performed on individual pallets 22, and after the sewing machine 1 is accurately calibrated for one pallet 22, the workpiece on the same pallet 22 may then be sewed based on a sewing program particular to the workpiece without the burden of changing between a calibration pallet and a workpiece pallet. Moreover, the image capturing device 21 (see FIG. 1) may be used to read a quick response (QR) code on the pallet 22 for identification of the workpiece/pallet. In this way, hardware cost for a QR code reader may be saved.

To sum up, the method and the system for automatic calibration of a needle position relative to a coordinate system of a sewing machine according to the disclosure have at least the following advantages. Except for the act of overlaying the to-be-penetrated sheet 26 on the test hole 25, the needle position relative to the coordinate system may be automatically calibrated without manual operation by virtue of the image capturing device 21, the reference mark 24 provided on the pallet 22, and the procedure (i.e., steps S41-S47) performed by the controller 23. In addition, since the controller 23 is configured to determine the actual distances (Ex, Ey) by which the needle hole 27 is away from the reference mark 24 through analyzing the image captured by the image capturing device 21, the accuracy of calibration is improved in the disclosure (about +/−0.05 mm) compared with human judgment in the conventional approach. Moreover, with the aid of the reference mark 24 and the reference line 28 provided on the pallet 22, the image capturing device 21 need not be mounted perfectly on the sewing head 11, that is, the system and the method of the disclosure are tolerant of a certain shift or angular misalignment of the FOV 221 with respect to the coordinate system so as to allow quick mounting/dismounting of the image capturing device 21.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatic calibration of a needle position relative to a coordinate system of a sewing machine, the sewing machine including a needle, an image capturing device which is disposed adjacent to the needle, and an X-Y table mechanism to which a pallet is attached and which brings the pallet to move with respect to the needle, the pallet being provided with a reference mark that has a center at a first position defined by first coordinates of the coordinate system, and being formed with a test hole that has a center at a second position defined by second coordinates of the coordinate system and spaced apart from the first position by a reference distance along one of an X axis and a Y axis of the coordinate system, the test hole being overlaid with a to-be-penetrated sheet, the method to be implemented by a controller and comprising steps of:

controlling the X-Y table mechanism to move the pallet according to the second coordinates to bring the to-be-penetrated sheet, which overlays the test hole, under the needle;

lowering the needle to penetrate the to-be-penetrated sheet to form a needle hole in the to-be-penetrated sheet, and then raising the needle;

controlling the X-Y table mechanism to move the pallet to bring the reference mark and the test hole into a field of view (FOV) of the image capturing device;

obtaining, by using the image capturing device, an image of the pallet within the FOV of the image capturing device, the image containing the reference mark and the needle hole formed in the to-be-penetrated sheet;

determining a location of the center of the reference mark and a location of the needle hole in the image;

determining an amount of separation of the location of the needle hole from the location of the center of the reference mark in the image; and calibrating a position of the needle relative to the coordination system based on the amount of separation thus determined and the reference distance.

2. The method of claim 1, wherein the step of determining an amount of separation includes:

determining distances in pixels between the location of the center of the reference mark and the location of the needle hole in the image along a horizontal direction and a vertical direction of the image, respectively.

3. The method of claim 2, wherein the step of calibrating a position of the needle includes:

determining actual distances between the center of the reference mark and the needle hole in the pallet respectively along the X axis and the Y axis of the coordinate system based on the distances in pixels thus determined and a spatial resolution of the image capturing device;

calculating a difference between the reference distance along said one of the X axis and the Y axis and the actual distance along said one of the X axis and the Y axis to result in an offset distance along said one of the X axis and the Y axis; and adjusting the needle relative to the coordinate system along said one of the X axis and the Y axis by the offset distance, and adjusting the needle relative to the coordinate system along the other one of the X axis and the Y axis by the actual distance along the other one of the X axis and the Y axis.

4. The method of claim 3, the pallet being further provided with a reference line which is parallel to the X axis of the coordinate system when the pallet is attached to the X-Y table mechanism, the image obtained by using the image capturing device further containing the reference line, the method further comprising:
  calculating an angle between the reference line contained in the image and a theoretical horizontal line in the image;
  wherein the step of determining actual distances between the center of the reference mark and the needle hole includes:
    determining the actual distances between the center of the reference mark and the needle hole in the pallet respectively along the X axis and the Y axis of the coordinate system based on the distances in pixels thus determined, the spatial resolution of the image capturing device, and the angle thus calculated.

5. The method of claim 4, wherein the angle between the reference line and the theoretical horizontal line is calculated according to the equation of:

$$\alpha = \arctan\left(\frac{dy1 + dy2}{dx1}\right),$$

where α represents the angle between the reference line and the theoretical horizontal line, dy1 and dy2 respectively represent displacements of two terminations of the reference line from the theoretical horizontal line along the vertical direction of the image, respectively, and dx1 represents a distance between the two terminations along the horizontal direction of the image.

6. The method of claim 4, wherein the actual distances between the center of the reference mark and the needle hole in the pallet along the X axis and the Y axis of the coordinate system, respectively, are calculated according to a set of equations of:

$Ex=Ex'\cos(180-\alpha)-Ey'\sin(180-\alpha)$, and $Ey=Ex'\sin(180-\alpha)+Ey'\cos(180-\alpha)$, where Ex and Ey respectively represent the actual distances between the center of the reference mark and the needle hole in the pallet respectively along the X axis and the Y axis, Ex' and Ey' respectively represent converted distances from pixels to a designated unit of length between the location of the center of the reference mark and the location of the needle hole in the image respectively along the horizontal direction and the vertical direction of the image, and c represents the angle between the reference line and the theoretical horizontal line.

7. The method of claim 6, wherein the converted distances from pixels to the designated unit of length between the location of the center of the reference mark and the location of the needle hole in the image respectively along the horizontal direction and the vertical direction of the image are each calculated by multiplying a respective one of the distances in pixels with the spatial resolution of the image capturing device.

8. The method of claim 3, the pallet being further provided with a reference line which is parallel to the Y axis of the coordinate system when the pallet is attached to the X-Y table mechanism, the image obtained by using the image capturing device further containing the reference line, the method further comprising:
  calculating an angle between the reference line contained in the image and a theoretical vertical line in the image;
  wherein the step of determining actual distances between the center of the reference mark and the needle hole includes:
    determining the actual distances between the center of the reference mark and the needle hole in the pallet respectively along the X axis and the Y axis of the coordinate system based on the distances in pixels thus determined, the spatial resolution of the image capturing device, and the angle thus calculated.

9. The method of claim 3, the pallet being further provided with a reference rectangle one side of which is parallel to the X axis of the coordinate system when the pallet is attached to the X-Y table mechanism, the image obtained by using the image capturing device further containing the reference rectangle, the method further comprising:
  calculating conversion ratios between pixels and a designated unit of length along the horizontal direction and the vertical direction of the image, respectively, based on locations of four corners of the reference rectangle in the image, and dimensions of the reference rectangle in the designated unit of length;
  calculating an angle between the said one side of the reference rectangle contained in the image and a theoretical horizontal line in the image;
  wherein the step of determining actual distances between the center of the reference mark and the needle hole includes:
    determining the actual distances between the center of the reference mark and the needle hole in the pallet respectively along the X axis and the Y axis of the coordinate system based on the distances in pixels thus determined, the conversion ratios thus calculated, and the angle thus calculated.

10. The method of claim 1, wherein the step of controlling the X-Y table mechanism to move the pallet to bring the reference mark and the test hole under a field of view (FOV) of the image capturing device includes:
  controlling the X-Y table mechanism to move the pallet to bring a middle point, which is between the center of the reference mark and the center of the test hole, under a center of the FOV of the image capturing device.

11. The method of claim 10, the sewing machine further including a sewing head to which the needle is attached, and on which the image capturing device is mounted such that the center of the FOV of the image capturing device is spaced apart from the needle by a first mounting distance along the X axis and a second mounting distance along the Y axis, the second position being spaced apart from the first position by the reference distance along the Y axis of the coordinate system, wherein the step of controlling the X-Y table mechanism to move the pallet to bring a middle point under a center of the FOV of the image capturing device includes:
  controlling the X-Y table mechanism to move the pallet by the first mounting distance along the X axis, and by a distance along the Y axis which is equal to a difference between the second mounting distance and a quotient of the reference distance divided by two.

12. The method of claim 10, the sewing machine further including a sewing head to which the needle is attached, and on which the image capturing device is mounted such that the center of the FOV of the image capturing device is spaced apart from the needle by a first mounting distance along the X axis and a second mounting distance along the Y axis, the second position being spaced apart from the first position by the reference distance along the X axis of the coordinate system, wherein the step of controlling the X-Y table mechanism to move the pallet to bring a middle point under a center of the FOV of the image capturing device includes:
controlling the X-Y table mechanism to move the pallet by the second mounting distance along the Y axis, and by a distance along the X axis which is equal to a difference between the first mounting distance and a quotient of the reference distance divided by two.

13. A system for automatic calibration of a needle position relative to a coordinate system of a sewing machine, the sewing machine including a needle and an X-Y table mechanism, the system comprising:
an image capturing device which is to be disposed adjacent to the needle;
a pallet which is to be attached to the X-Y table mechanism and which is to be brought by the X-Y table mechanism to move with respect to the needle, the pallet being provided with a reference mark that has a center at a first position defined by first coordinates of the coordinate system, and being formed with a test hole that has a center at a second position defined by second coordinates of the coordinate system and spaced apart from the first position by a reference distance along one of an X axis and a Y axis of the coordinate system, the test hole being overlaid with a to-be-penetrated sheet; and
a controller which is electrically connected to the X-Y table mechanism and said image capturing device, and which is configured to
control the X-Y table mechanism to move said pallet according to the second coordinates to bring the to-be-penetrated sheet, which overlays the test hole, under the needle,
lower the needle to penetrate the to-be-penetrated sheet to form a needle hole in the to-be-penetrated sheet, and then raise the needle,
control the X-Y table mechanism to move said pallet to bring the reference mark and the test hole into a field of view (FOV) of the image capturing device,
obtain, by using said image capturing device, an image of said pallet within the FOV of said image capturing device, the image containing the reference mark and the needle hole formed in the to-be-penetrated sheet,
determine a location of the center of the reference mark and a location of the needle hole in the image,
determine an amount of separation of the location of the needle hole from the location of the center of the reference mark in the image, and
calibrate a position of the needle relative to the coordination system based on the amount of separation thus determined and the reference distance.

14. The system of claim 13, wherein said controller is further configured to:
determine distances in pixels between the location of the center of the reference mark and the location of the needle hole in the image along a horizontal direction and a vertical direction of the image, respectively.

15. The system of claim 14, wherein said controller is further configured to:
determine actual distances between the center of the reference mark and the needle hole in the pallet respectively along the X axis and the Y axis of the coordinate system based on the distances in pixels thus determined and a spatial resolution of said image capturing device;
calculate a difference between the reference distance along said one of the X axis and the Y axis and the actual distance along said one of the X axis and the Y axis to result in an offset distance along said one of the X axis and the Y axis; and
adjust the needle relative to the coordinate system along said one of the X axis and the Y axis by the offset distance, and adjust the needle relative to the coordinate system along the other one of the X axis and the Y axis by the actual distance along the other one of the X axis and the Y axis.

16. The system of claim 15, wherein
said pallet is further provided with a reference line which is parallel to the X axis of the coordinate system when the pallet is attached to the X-Y table mechanism, and the image obtained by using the image capturing device further contains the reference line;
said controller is further configured to
calculate an angle between the reference line contained in the image and a theoretical horizontal line in the image, and
determine the actual distances between the center of the reference mark and the needle hole in the pallet respectively along the X axis and the Y axis of the coordinate system based on the distances in pixels thus determined, the spatial resolution of said image capturing device, and the angle thus calculated.

17. The system of claim 16, wherein the angle between the reference line and the theoretical horizontal line is calculated according to the equation of:

$$\alpha = \arctan\left(\frac{dy1 + dy2}{dx}\right),$$

where α represents the angle between the reference line and the theoretical horizontal line, dy1 and dy2 respectively represent displacements of two terminations of the reference line from the theoretical horizontal line along the vertical direction of the image, respectively, and dx represents a distance between the two terminations along the horizontal direction of the image.

18. The system of claim 16, wherein the actual distances between the center of the reference mark and the needle hole in the pallet along the X axis and the Y axis of the coordinate system, respectively, are calculated according to a set of equations of:

$$Ex=Ex' \cos(80-\alpha)-Ey' \sin(180-\alpha), \text{ and}$$

$$Ey=Ex' \sin(180-\alpha)+Ey' \cos(180-\alpha),$$

where Ex and Ey respectively represent the actual distances between the center of the reference mark and the needle hole in the pallet respectively along the X axis and the Y axis, Ex' and Ey' respectively represent converted distances from pixels to a designated unit of length between the location of the center of the reference mark and the location of the needle hole in the image respectively along the horizontal direction and the vertical direction of the image, and a represents the angle between the reference line and the theoretical horizontal line.

19. The system of claim 18, wherein the converted distances from pixels to the designated unit of length between the location of the center of the reference mark and the location of the needle hole in the image respectively along the horizontal direction and the vertical direction of the image are each calculated by multiplying a respective one of the distances in pixels with the spatial resolution of the image capturing device.

20. The system of claim 15, wherein
said pallet is further provided with a reference rectangle one side of which is parallel to the X axis of the coordinate system when the pallet is attached to the X-Y table mechanism, and the image obtained by using the image capturing device further contains the reference line;

said controller is further configured to
calculate conversion ratios between pixels and a designated unit of length along the horizontal direction and the vertical direction of the image, respectively, based on locations of four corners of the reference rectangle in the image, and dimensions of the reference rectangle in the designated unit of length, calculate an angle between said one side of the reference rectangle contained in the image and a theoretical horizontal line in the image, and determine the actual distances between the center of the reference mark and the needle hole in the pallet respectively along the X axis and the Y axis of the coordinate system based on the distances in pixels thus determined, the conversion ratios thus calculated, and the angle thus calculated.

21. The system of claim 12, wherein said controller is further configured to:
control the X-Y table mechanism to move the pallet to bring a middle point, which is between the center of the reference mark and the center of the test hole, under a center of the FOV of said image capturing device.

22. The system of claim 12, wherein the reference distance is not greater than three tenths of a dimension of the FOV of said image capturing device.

* * * * *